US007852998B1

(12) United States Patent
Smith et al.

(10) Patent No.: US 7,852,998 B1
(45) Date of Patent: Dec. 14, 2010

(54) SYSTEM AND PROCESS FOR MASS TELEPHONY CONFERENCE CALL

(75) Inventors: Rodney A. Smith, Washington, DC (US); Vladimir Smelyansky, Glenview, IL (US)

(73) Assignee: Tele-Town Hall, LLC, Washington, DC (US)

( * ) Notice: Subject to any disclaimer, the term of this patent is extended or adjusted under 35 U.S.C. 154(b) by 1432 days.

(21) Appl. No.: 10/954,837

(22) Filed: Sep. 30, 2004

Related U.S. Application Data

(60) Provisional application No. 60/510,925, filed on Oct. 14, 2003.

(51) Int. Cl.
*H04M 3/42* (2006.01)

(52) U.S. Cl. .................................. 379/202.01; 370/261

(58) Field of Classification Search ......... 370/260–269; 379/93.21, 158, 202.01, 205, 205.01, 434, 379/202, 100.14, 100.4
See application file for complete search history.

(56) References Cited

U.S. PATENT DOCUMENTS

| | | | | |
|---|---|---|---|---|
| 4,796,293 | A * | 1/1989 | Blinken et al. | 379/202.01 |
| 5,483,587 | A * | 1/1996 | Hogan et al. | 379/202.01 |
| 5,903,637 | A * | 5/1999 | Hogan et al. | 379/203.01 |
| 5,924,041 | A | 7/1999 | Alperovich et al. | |
| 6,023,452 | A * | 2/2000 | Shiragaki | 370/227 |
| 6,275,575 | B1 | 8/2001 | Wu | |
| 6,597,667 | B1 * | 7/2003 | Cerna | 370/260 |
| 6,967,672 | B1 | 11/2005 | Huber et al. | |
| 7,006,455 | B1 | 2/2006 | Fandrianto et al. | |
| 7,113,512 | B1 | 9/2006 | Holmgren et al. | |
| 7,119,828 | B1 | 10/2006 | Kizherman et al. | |
| 7,151,753 | B2 | 12/2006 | Chaney et al. | |
| 7,257,090 | B2 | 8/2007 | Seavers et al. | |
| 7,412,047 | B2 | 8/2008 | Nguyen et al. | |
| 2002/0118808 | A1 * | 8/2002 | Kelleher et al. | 379/202.01 |
| 2003/0055899 | A1 * | 3/2003 | Burger et al. | 709/205 |
| 2003/0163526 | A1 * | 8/2003 | Clarisse et al. | 709/204 |
| 2004/0080504 | A1 | 4/2004 | Salesky et al. | |
| 2004/0086093 | A1 | 5/2004 | Schranz | |
| 2004/0101119 | A1 * | 5/2004 | Malcolm et al. | 379/202.01 |
| 2004/0119814 | A1 * | 6/2004 | Clisham et al. | 348/14.08 |

(Continued)

OTHER PUBLICATIONS

Broadnet: Global Delivery, Instant Results. www.broadnet.us/teleforum.html (1 of 2) Sep. 11, 2007.

(Continued)

*Primary Examiner*—Fan Tsang
*Assistant Examiner*—Akelaw A Teshale
(74) *Attorney, Agent, or Firm*—Jean C. Edwards, Esq.; Akerman Senterfitt

(57) ABSTRACT

An automated teleconferencing control system and method reduces conference call setup time by simultaneously out dialing to multiple conferees through a plurality of parallel telecommunications resources. The teleconferencing control system includes the feature of automatically gathering statistics of each connection attempt, as well as many other call aspects, using these statistics to automatically improve the efficiency of subsequent conference call initiations. Gathered statistics are also used to automatically configure the system to cause all of the conferees to be connected to a conference call at substantially the same time. The selection of which telecommunications resources are used for contacting each target conferee is made based on criteria that include the telephone number or Internet address of the target conferee's telephone.

20 Claims, 8 Drawing Sheets

U.S. PATENT DOCUMENTS

| | | |
|---|---|---|
| 2004/0125933 A1 | 7/2004 | Jun et al. |
| 2004/0218744 A1 | 11/2004 | Nguyen et al. |
| 2004/0228292 A1 | 11/2004 | Edwards |
| 2005/0018826 A1* | 1/2005 | Benco et al. .......... 379/202.01 |
| 2005/0135279 A1 | 6/2005 | Zabawskyj |
| 2006/0067499 A1 | 3/2006 | Oliveira et al. |
| 2006/0189337 A1 | 8/2006 | Farrill et al. |
| 2006/0274675 A1 | 12/2006 | Kizhnerman |
| 2006/0293073 A1 | 12/2006 | Rengaraju et al. |
| 2007/0121859 A1 | 5/2007 | Smelyansky et al. |
| 2007/0294263 A1 | 12/2007 | Punj et al. |

OTHER PUBLICATIONS

Camtasia Studio 4, http://clientmanager.broadnet.us/MarketingPieceNew/newformatFC.html, 3 pages, Sep. 11, 2007.

* cited by examiner

SYSTEM AND PROCESS FOR MASS TELEPHONY CONFERENCE CALL

CROSS-REFERENCE TO RELATED APPLICATIONS

This application is a conversion of U.S. Provisional Application No. 60/510,925 filed Oct. 14, 2003, which is herein incorporated by reference in its entirety.

TECHNICAL FIELD

This invention relates generally to telephony systems. More particularly the invention relates to a system and method for initiating and controlling conference calls through any telecommunications or media system.

BACKGROUND OF THE INVENTION

The disclosure of this invention will focus on its application in the traditional telephone system. This is done for the sake of clarity and brevity, since describing the application of this invention in each of the other telecommunication systems would be needlessly tedious. It will become clear to a person reasonably skilled in this art that the methods described in this disclosure can be applied similarly to any telecommunication system.

Several methods are currently in use for establishing a telephone conference call. These include:

1. Prearrange a time when each conferee will dial a specified phone number to join a conference call. At the prearranged time, as each conferee makes a connection to the specified phone number, they are automatically joined to a conference call that is already operational before any conferees have joined.
2. A call administrator manually dials each target conferee, placing each contacted conferee on hold while attempting to contact the remainder of the target conferees. Then, when all conferees have been contacted, the call administrator causes them all to be simultaneously bridged into the conference call via features available in a local PBX or telephony switch system.
3. A method described in 2 above, wherein a computerized system replaces the call administrator, performing the same functions automatically.

In method 1 (above), the process is semi-coordinated in that a prearranged time is used as a target connection time for each conferee. One problem with this approach is that it relies on the conferees to remember the exact prearranged time of the call. It also relies on the expectation that each of the conferees will initiate their connection to the conference call at the same time (any delay by one or more conferees to initiate dialing will delay the effective start time of the conference call). This approach also assumes that all of the target conferees' time clocks are precisely synchronized (even a few minutes of difference between clocks can delay the effective start time of the conference call). Another disadvantage of this approach is that, intentionally or unintentionally, uninvited participants can be connected into the conference call at any time during the call. One advantage to this approach is that the process of initiating the conference call is parallel in nature. This can reduce the amount of time required to connect all of the conferees to the conference call. Unfortunately, this approach's parallel activity is uncoordinated and relies on the memories and attentiveness of each of the target conferees. Thus, problems remain with this approach.

In method 2 (above), the manual process of serially dialing even a few conferees is tedious, time consuming and error prone. If a significant number of conferees are included, this process becomes completely impractical due to the amount of time required to contact the entire list of conferees before the conference call can start. One benefit of having a person manually dial each of the target conferees is that the person has the ability to detect and correct errors on the conferee list (wrong or disconnected phone number, etc.). This person can also determine in real time whether the correct person has answered the phone, whether or not an answering machine or voicemail has been reached, whether the connection time has become unreasonable or unusually long and, finally, whether or not the target conferee accepts the invitation to the conference call. Another advantage of having a person manually dial each target conferee is that the person can redial the conferee if their connection is lost and it is known that the conferee wishes to continue to participate in the conference call. Thus, problems remain with this approach.

In method 3 (above), the automation of the dialing process removes the tedious dialing task from a human, and reduces the time required to contact the entire list of conferees. However, the dialup process is still serial, thereby incurring the unavoidable accumulation of delays associated with contacting each conferee.

Many systems exist for automatically initiating and controlling conference calls. Even the most automated of these systems, however, invariably uses the same basic process to initiate a conference call. The basic process includes the serial steps of:

1. Dialing a conferee (from among those found on a list of target conferees).
2. If contact is made with the target conferee, making a connection between that conferee and the pending conference call.
3. After these first steps are completed, the process is repeated for the next conferee on the list.

This continues until all of the target conferees have been contacted and connected to the conference call. At this point, the conference call can begin.

As described below, this serial dialup process has several disadvantages.

The first disadvantage of the serial dialup process is that the conference call is stalled (with participants waiting on hold) while the remaining conferees are being connected to the call. Since the time required for each connection to a conferee may be several seconds (typically 5 or 6 seconds before the dialed number even begins ringing), when the quantity of conferees exceeds 20 the conferee who was contacted first is required to wait up to 2 minutes before the call becomes operational. This may seem insignificant, but as the quantity of conferees rises, the delay associated with contacting all of the conferees rises proportionally. When a massive list of conferees is used (as occurs when a conference call is used to disseminate a corporate announcement), this delay becomes burdensome. For instance, if a conference call is intended to reach 5000 employees of a company, the cumulative connection delay could exceed 7 hours (assuming an average connection time of 5 seconds per conferee). This makes the serial dialup approach impractical for this application (or any other mass telephony conference application).

A second disadvantage of existing conference call initiation processes is that statistics are not kept that can be used to make subsequent conference calls to the same conferees more efficient. For instance, if a target conferee changes their phone number, time is wasted unsuccessfully attempting to contact them at their old phone number. Not only does this waste time and resources, it can potentially annoy someone who has since acquired the old phone number.

Yet another disadvantage of existing conference call initiation systems is the inherent risk of using a single dial-out source (telephony switch or PBX). Should this switch fail (or its connections to the PSTN fail), the successful completion of the conference call becomes impossible.

Another significant disadvantage of current conference call initiation systems is that there is no mechanism for determining whether a conferee, who has disconnected from the conference call in progress, desires to be reconnected to the call.

From this explanation it can be seen that a method and article are needed for reducing the amount of time required to connect an entire list of target conferees to a conference call. It can also be seen that there is a need for a conference call system that is not vulnerable to a failure of a single telephony switch or that switch's network connections. Further, it can be seen that there is a need for a conference call system that automatically gathers and analyzes statistics of a conference call in order to improve the efficiency of the conference call initiation process for subsequent conference calls. It can also be seen that there is a need for a conferencing control system that can determine whether a connection should be joined to the conference call based on predefined parameters and detected conditions. It can finally be seen that there is a need for a conferencing control system that can determine whether a disconnected conferee should be reconnected to the conference call by either automatically out dialing to the conferee, or by allowing the conferee to dial a predefined phone number, and after being revalidated, be reconnected to the call.

SUMMARY OF THE INVENTION

Accordingly, it is an object, feature, or advantage of the present invention to provide a method for dramatically reducing the time required to notify a group of target conferees and incorporate them into a conference call.

It is another object, feature, or advantage of this invention to provide a method and article for initiating a conference call, wherein the process includes allowing a target conferee to validate that they are the appropriate party, then accept or reject an invitation to a conference call, the response of the target conferee being recorded and later used (along with other factors) to determine whether that conferee should be auto-reconnected or allowed to reconnect to an ongoing conference call when connection has been lost to that conferee.

It is yet another object, feature, or advantage of the invention to provide an article and method for automatically redialing a conference call participant who has been disconnected, yet has indicated a desire to participate in the entire conference call. This object also includes the ability of the invention to detect a predefined disconnect signal from a conferee, the signal indicating that the conferee chooses to voluntarily disconnect from an ongoing conference call, thus indicating that the conferee should not be automatically reconnected to the ongoing call.

It is also an object, feature, or advantage of the invention to provide an article and method for preventing call answering automation systems from becoming connected to a conference call, as well as for preventing uninvited parties from joining a conference call.

It is yet another object, feature or advantage of the invention to provide a conferencing controller that automatically detects a connection failure that is due to busy signals, "telephone number changed" or "telephone number disconnected" (or similar) messages when attempting to connect to a specific target conferee. This conferencing controller then records this information in association with the specific target conferee to prevent further attempts to connect to the same target conferee via the same contact phone number or digital address, and alerts the conferencing controller's users that this specific target conferee's contact information should be updated.

It is further an object, feature, or advantage of this invention to provide an article and method for automatically storing conference call activity statistics, such as call initiation start time, operational conference call start and end times, individual conferee connection and disconnect times, the telecommunications resources associated with each conferee's connection, any failures associated with attempting to contact each conferee, along with many other useful statistics.

An additional object, feature or advantage of the invention is to provide a method for automatically analyzing these gathered statistics to establish decision-making criteria that can be used to increase the efficiency, coordination and speed of subsequent attempts to contact conferees.

It is additionally an object of the invention to provide an article and method that makes statistical system performance data available to external processes for analysis and billing purposes.

It is finally an object of the present invention to provide an article and method for reducing vulnerability to a single point of failure in the available telephony resources.

One or more of these and/or objects and other features and advantages are obtained in a teleconferencing control system that can be positioned in any location that provides connectivity to selected telephony resources either via the Internet or other data communications networks. This teleconferencing control system stores a list of target conferees' contact phone numbers and/or digital connection addresses. When a conference call is initiated by this teleconferencing control system, a computer, using an intelligent, coordinated, parallel distributed dialing approach, having controlling access to multiple parallel telephony resources, selectively assigns available telephony resources for each out dial to a target conferee (this selection is based on the phone number or digital address of the target conferee, the location of the target telecommunications device, system load-balancing requirements, the known quality of the selected telephony resources and the predicted connection delay known to be associated with the selected telephony resources).

In a preferred embodiment of the invention, the teleconferencing control system comprises a data network server computer that will host the conference call, handling inter-conferee information exchange in the digital domain. This data network server, in the preferred configuration, is connected in parallel through multiple data networks to multiple voice-over-Internet protocol (VoIP) telephony gateways (though a single data path to a single VoIP gateway will suffice). This teleconferencing control system stores a list of target conferees for each conference call, instigating a simultaneous, parallel, distributed out dialing of the target conferees upon detection of a manual trigger, or automatically at a predefined time or upon detection of a set of specified trigger conditions.

This teleconferencing control system, for each conferee on the list, initiates a connection attempt through selected telephony resources. Instead of waiting for connection to a conferee before proceeding (as is currently done in the art), the present invention, in a parallel fashion through multiple telephony resources, initiates the dialing of multiple conferees simultaneously. Preferably, connection attempts to all target conferees are started at precisely the same time, or with a coordinated timing that is automatically adjusted per target conferee to account for variations in known connection delays associated with selected telephony resources. In this manner, the entire target conferee base is connected substantially simultaneously to the conference call. It is to be understood that connecting substantially simultaneous or substantially at the same time does not require that the connection, be made at the exact and precise time, but rather such that it appears to be simultaneous or substantially simultaneous to the conferees. The terms "simultaneous" and "substantially simultaneous" exclude sequential attempts to connect.

The selection of the telecommunications resources to use for out dialing a given conferee is determined based on an algorithm that factors in:

1. The location of the conferee's phone.
2. The predicted telephony resource loading.
3. The costs associated with the selected connection route.
4. The type of system through which the conferee will be connected.
    a. PSTN voice telephony system.
    b. Video conferencing system.
    c. Voice over Internet protocol (VoIP) system.
    d. Wireless versus wireline system.
5. Statistical connection speed performance histories of available telecommunications resources and routes.
6. Statistical quality performance histories of available telecommunications resources and routes.
7. In the case of VoIP connections, the statistical quality performance histories of available network servers and services.

A significant advantage of this approach over prior art is that when a conference call is initiated, the amount of time required to contact each of the target conferees, and to finally connect all conferees together for the call is dramatically reduced. In addition, since the out dialing of each conferee is done through a selected telecommunications resource (from among a plurality of available resources), the probability of providing a best-quality and least expensive conference call is improved. Also, since more than a single route is available for contacting conferees, the possibility of a conference call (or portions thereof) being blocked due to call traffic overloading or failure of telephone system resources is reduced.

Since dialing multiple conferees can be done in a parallel manner, there is no requirement for the teleconferencing system to endure the delays inherent with serial dialing through a single telecommunications resource. This is significant because the call setup and connection process for existing telecommunications systems has a lower limit in terms of completion time. This is due to current telecommunications system design, which requires that a telecommunications switch receive a signal or message from the call initiator, which takes a finite period of time to accomplish, followed by further required signaling between the initial switch and a distant switch (which may directly ring a targeted telephone, or require connection through one or more other switches before a connection can be made to the target telephone). Each link through a telecommunications switch will add some minimum additional amount of processing time to the call connection process.

If the teleconferencing controller must wait for connection to each target conferee before out dialing to the next conferee on the list, the delays associated with each connection attempt are serialized, thereby creating a situation where, predictably, the more target conferees there are, the longer it will take to notify the entire conferee base and get them all simultaneously connected into the call.

In the present invention, the conferees are simultaneously out dialed through multiple telephony resources in at least a partially parallel manner. This means that, in the best case where each conferee is dialed through a separate telephony resource, the connection of all of the conferees to the conference call is completed when the slowest connection is completed. A simple calculation shows that this significantly reduces the overall time required to establish an operational conference call.

For example:

A conference call is initiated by a prior art conference call setup method by serially dialing each of 100 conferees to establish their connection to the call. Assuming an average call connection time of 6 seconds for each conferee, the conference call becomes fully operational after 600 seconds (10 minutes). In contrast, a conference call set up using the method disclosed in the present invention, using 100 separate telecommunications switches for out dialing to the conferees (one switch per conferee), the conference call would be fully operational after only 6 seconds. This provides a dramatic reduction in the conference call setup time.

Considering the amount of time a conferee must wait (on hold) for a conference call to start using the prior art setup method, there is a notable benefit to the conferee in using the method of the present invention, since the on-hold time is nearly eliminated (in some scenarios, the on-hold time is eliminated entirely).

In an alternate embodiment of the invention, a teleconferencing controller can eliminate the need for an intermediate protocol conversion of the voice and data signaling. In this embodiment, the conferencing controller does not host the conference call, but rather connects all of the participating conferees to an external conference hosting system. This alternate embodiment of the invention is configured in a way that allows the conferencing controller to have direct controlling access to telephony switches, causing the switches to out dial to the conferees in a coordinated, parallel manner. The conferencing controller can either command the telephony switch to connect the conferees to a specified telephone number (a conference in progress or about to begin), or can command the telephony switch to access a local conference call setup list that specifies the dial out effort parameters.

In another alternate embodiment of the present invention, the conferencing controller maintains a cross-reference list that identifies conference call "groups." When a conference call is triggered for an identified group, the group identifier is used to determine which telephony switch(es) or VoIP gateway server(s) should be engaged to assist in initiating the call. Each of the selected switch(es) or VoIP gateway server(s) contains a local cross-reference list that associates a group identifier with the task of making connection to one or more locally listed conferees. The conferencing controller of this embodiment of the invention sends each selected switch or VoIP gateway a signal or message that identifies a specific conferee group, allowing that switch or VoIP gateway to handle the parallel out dialing of the conferees contained in a localized list. This further distributes the dial out effort and reduces the communication bandwidth required for communicating the dial out information to the selected telephony resources, thus reducing the overall time required to set up a conference call.

In a further alternative embodiment, the present invention can be implemented as a telephony switch-internal configuration, where the parallel out dialing logic is contained and operated within the telephony switch, and the switch's internal conferencing resources are used.

The present invention can better be visualized and understood by turning to the following drawings where like elements are referenced by like numerals.

DETAILED DESCRIPTION OF THE PREFERRED EMBODIMENT

Figure 1:
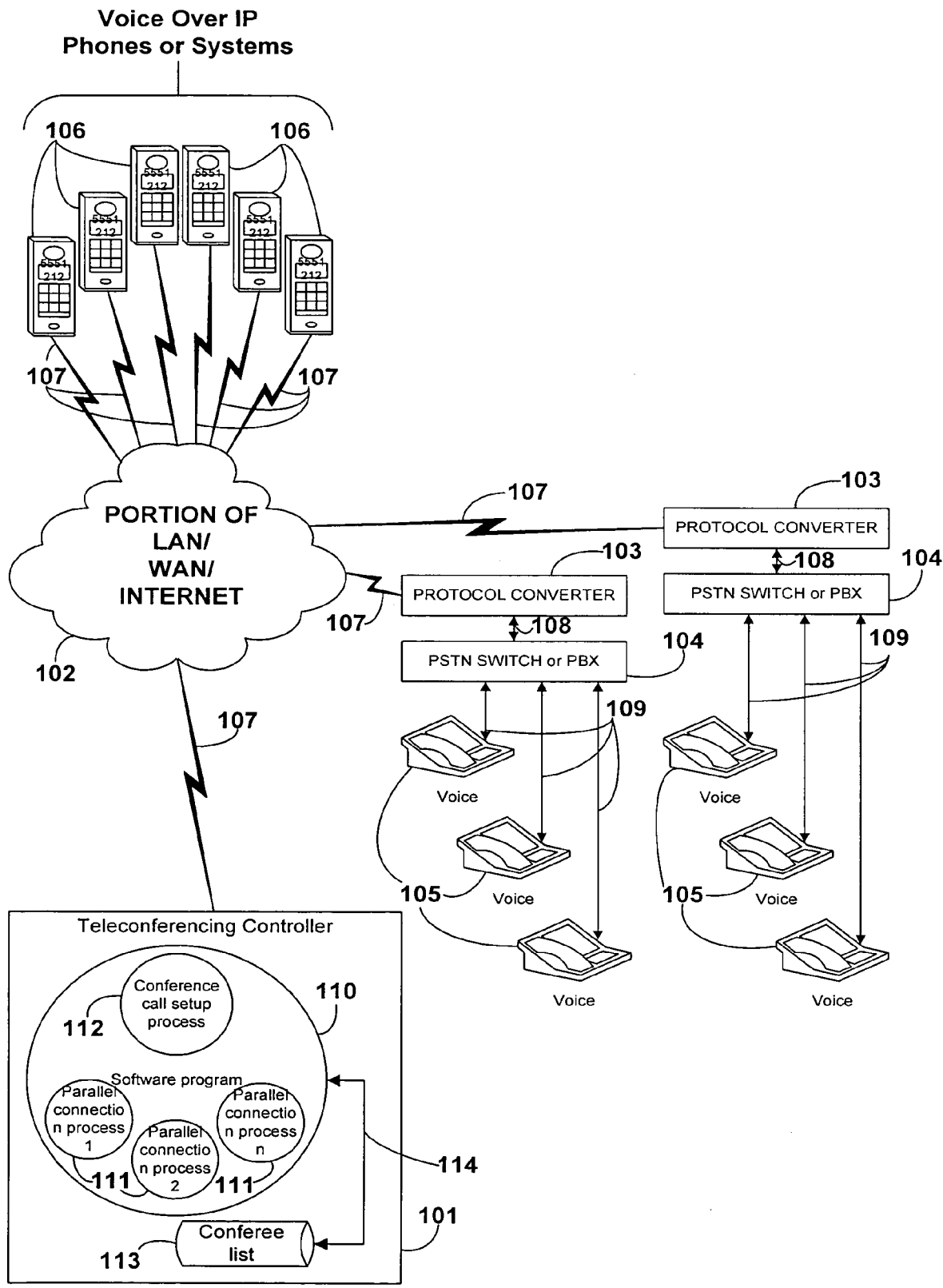
FIG. 1 is a simplified block diagram of the preferred embodiment of the system hardware architecture of the invention as it interconnects to existing telephony systems.

Referring to the drawings, a preferred embodiment of the invention will be described. First, the overall hardware architecture and connections will be described, following which will be a description of the operation of the software which controls the invention's hardware and processes. The specific embodiments set forth herein are merely representative of the present invention and the present invention is not to be limited to these specific embodiments.

Conferencing System Hardware High-Level Architecture

It can be seen that in the preferred embodiment of the invention, there is an architecture that at least partially includes the elements shown in FIG. 1 of the drawings.

Now referring to FIG. 1 of the drawings, it can be seen that there is a software program 110 operating to control teleconferencing controller 101. Software program 110 contains conference call setup process 112, which is triggered when software program 110 detects a condition indicating that a conference call should be started. Additionally, software program 110 controls the existence and operation of all of n instances of parallel connection process 111. Available for access by software program 110 operating (and preferably residing within teleconferencing controller 101) is conferee list 113. Communications between software program 110 and conferee list 113 occurs through communications path 114.

Teleconferencing controller 101 is connected to, and communicates with, a portion of a LAN/WAN/INTERNET 102 network through a data network using a "voice-over-internet-protocol" (VoIP), or similar protocol via data network path 107. Note that, while only a single connection is shown in FIG. 1 for the sake of simplification, in actual practice, for the sake of redundancy and efficiency, one or more additional parallel connections are typically used to connect these two entities.

It can also be seen in FIG. 1 that a plurality of VoIP phones or systems 106 may be connected, each through a data network path 107, to a portion of the same LAN/WAN/INTERNET 102 network. Through these connections, teleconferencing controller 101 can communicate with these devices or systems.

Still referring to FIG. 1, it can be seen that a plurality of protocol converters 103 can also be connected to a portion of LAN/WAN/INTERNET 102, each through a data network path 107. Each protocol converter 103 handles the translation of signals and data formats between the selected VoIP (or similar) protocol and a telephony PSTN switch or PBX 104. Each protocol converter 103 communicates with its associated PSTN switch or PBX 104 through a telephony interface path 108. Note that while a one-to-one relationship is shown as an example in FIG. 1 between a protocol converter 103 and an associated PSTN switch or PBX 104, a single protocol converter 103 can communicate with more than one associated PSTN switch or PBX 104, and conversely a single PSTN switch or PBX 104 can communicate with more than one protocol converter 103.

Finally, in FIG. 1 it can be seen that each PSTN switch or PBX 104 communicates with each of a plurality of traditional voice telephones 105 through a switch-to-phone interface 109. This link represents any of the available well known standard telephony interfaces between switching systems and telephones as well as any privately held proprietary interface between a telephony switch and its associated telephone base.

It is important to note that while both VoIP (or similar) protocol phones and standard PSTN voice phones are shown in FIG. 1 to indicate that both can be accommodated simultaneously, the methods of the present invention are not limited to these specific protocols, and can be practiced using any one or more of the available communications protocols.

A software program 110, along with a conference call setup process 112 and one or more parallel connection processes 111, operates to control the actions of teleconferencing controller 101, actuating the methods, functions and features made available through practice of the present invention.

While one or more conferee lists 113 are stored in a data storage medium accessible to software program 110 operating on teleconferencing controller 101, these conferee lists 113 are not necessarily stored physically within the hardware of teleconferencing controller 101, since well known techniques in network technologies allow each of the lists to reside at any accessible network node. Each stored conferee list 113 defines the targeted conferees for a predefined conference call, along with detailed parameters related to each targeted conferee. Some or all of the conferee-specific elements shown in Table 1 are stored for each conferee in each stored conferee list 113.

TABLE 1

Contents of conferee list

| LIST ELEMENT | DESCRIPTION |
| --- | --- |
| Conferee ID | Used as a key to link connection statistics to this conferee. |

TABLE 1-continued

Contents of conferee list

| LIST ELEMENT | DESCRIPTION |
| --- | --- |
| Conference call ID list | A list of the IDs of conference calls to which this conferee is assigned. |
| Remote Cache | A network resource identifier that specifies where this conferee's data is locally stored. |
| Conferee name | The name of the person who is a target conferee. |
| Conferee language | The spoken language in which any interactive messages will be delivered to this conferee. |
| Message mask | A bitmapped filter that identifies which messages will be delivered to the target conferee under various circumstances. |
| Conferee telephone number | PSTN telephone number that will be used to contact conferee when using classic voice telephone connection. |
| Alternate telephone number | Alternate PSTN telephone number that can be used to contact this conferee. |
| Network address | The network address to use for connecting this conferee when using VoIP (or similar) protocol. |
| Preferred contact protocol | The preferred protocol (PSTN, VoIP, etc.) to use when contacting this conferee. |
| Preferred network | The preferred network to use when attempting to contact this conferee. |
| Preferred switch/PBX | The preferred telecommunications switch or PBX to use when attempting to contact this conferee. |
| Start time offset | The amount of time to delay an attempt to connect to this conferee. |

Conferencing Controller Software Overview

Figure 2:
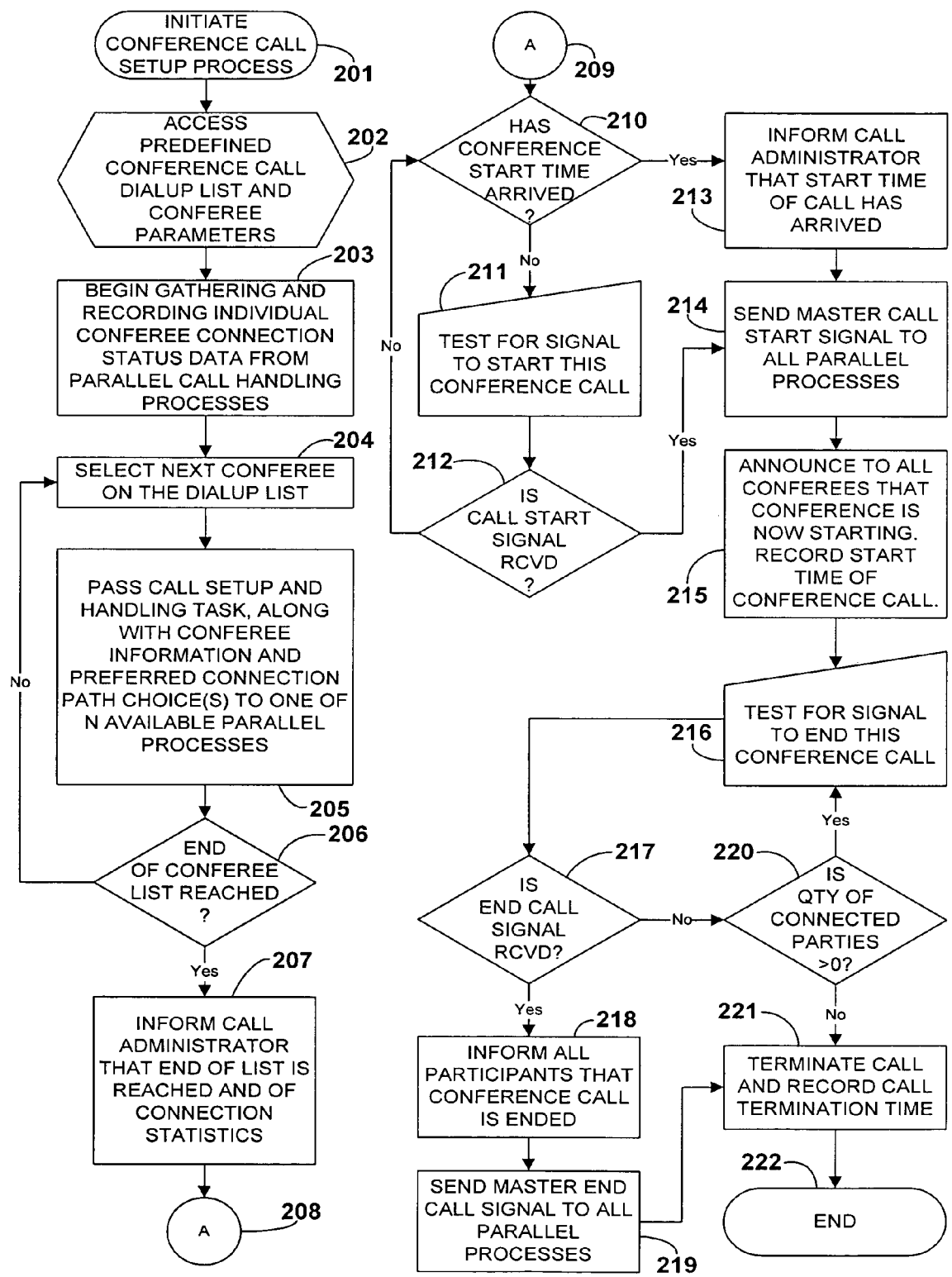
FIG. 2 is a simplified flow chart of the main loop of the controlling software program of the preferred embodiment of the invention.

Now referring the simplified software flowchart in FIG. 2 of the drawings, it can be seen that in the conference call setup process 112 of software program 110 (operating to control teleconferencing controller 101), there is a starting point block 201. At this point, software program 110 is already operating on teleconferencing controller 101, and there has been a trigger event or condition detected indicating that a conference call is to be initiated.

Since, to gain the claimed benefits of the present invention, the specific method of detecting and interpreting an initiating trigger event or condition and the specific method of identifying the applicable conferee list 113 is of no consequence, these details are omitted from this description of the invention. The present invention contemplates that any number of methodologies or approaches can be used as may be appropriate in particular situations. Generally, however, the present invention accommodates the initiating trigger and identification of the appropriate conferee list 113 in many forms. One example of this is the reception of a call from the conference call initiator that automatically identifies the caller (through the well known telephony "automatic number identifier" (ANI) signaling, or "caller ID" functionality), and thereby an associated conferee list 113. Alternately, a conference call can be triggered, and automatic selection of the associated conferee list 113 accomplished by computer software program 110 when it recognizes that a predefined call initiation time has arrived. Additionally, a user operating a network interface (traditionally, a web browser) can access an Internet or intranet web page where an option exists to trigger a conference call to any of a selection of conferee lists 113. The actions of the user of this web page are then communicated to software program 110 operating on teleconferencing controller 101, where the user's actions are interpreted as a trigger to initiate a conference call setup process 112 for the specified conferee list 113.

In the flowchart of FIG. 2 it can be seen that the beginning of conference call setup process 112 is starting point block 201, which connects to preparation block 202, where conference call setup process 112 accesses a pre-defined conferee list 113 that includes individual conferee parameters. Once conferee list 113 has been accessed, and the relevant data retrieved, conference call setup process 112 proceeds to process block 203 where conference call setup process 112 begins gathering and recording individual conferee connection status data from each of the parallel connection processes 111.

At this point, conference call setup process 112 enters a tight loop that includes process block 204, process block 205 and decision block 206. In this section of conference call setup process 112, the software steps sequentially through the entries of conferee list 113, and for each conferee on the list, assigns one of n available parallel connection processes 111 to manage establishment of maintenance of a connection to the selected conferee. In this manner, conference call setup process 112 is able to generate a simultaneous dial-out to some or all of the entries of conferee list 113 (since each of the assigned parallel connection processes 111 can proceed to connect to its assigned conferee without respect to any processing delays related to connection to any other target conferee).

Specifically, in process block 204, conference call setup process 112 selects the next conferee on the conferee list 113. Once this is accomplished (and the associated data has been acquired for the selected conferee), conference call setup process 112 proceeds to process block 205, where the call setup and handling for the selected conferee is passed to one of n available parallel connection processes 111. Along with this assignment, conference call setup process 112 passes to this instance of parallel connection process 111 any preferred connection path choices associated with the selected conferee that were retrieved from conferee list 113.

Once the call setup and handling for the selected conferee has been passed to an available parallel connection process 111, conference call setup process 112 proceeds to decision block 206, where a test is performed to determine whether the end of conferee list 113 has been reached. If the test shows that there are more entries of conferee list 113 yet to be processed, conference call setup process 112 returns to process block 204 for selection of the next conferee on the conferee list 113. Otherwise (all entries of the conferee list 113 have been processed), conference call setup process 112 proceeds to process block 207.

In process block 207, conference call setup process 112 informs the conference call administrator that the end of conferee list 113 has been reached. Process block 107 also makes available, to the conference call administrator, those connection statistics related to the call. These statistics may include information about how many conferees are currently connected, have accepted an invitation to the call and are waiting for the call to begin.

Once this is accomplished, conference call setup process 112 proceeds through connection point 208 and connection point 209 to decision block 210 where conference call setup process 112 enters a tight loop that includes decision block 210, manual input block 211 and decision block 212. In this loop, conference call setup process 112 monitors conditions to determine whether to begin the conference portion of the call.

Specifically, in decision block 210 conference call setup process 112 tests whether a predefined conference call start time has arrived. If this time has not arrived, conference call setup process 112 accepts any manual input signals that indicate whether a manual command to start the conference portion of the call has been received (for example, a traditional DTMF signal from one of the conferees or the call initiator). This test is accomplished in manual input block 216. Once this test is completed, conference call setup process 112 proceeds to decision block 217 where control of the program is returned to decision block 210 if such a manual command to start the conference portion of the call has not been received (thus returning to the top of this tight loop). However, if a manual command to start the conference portion of the call has been received, conference call setup process 112 proceeds to process block 214.

If in decision block 210 it is determined that a predefined start time for the conference call has arrived, conference call setup process 112 proceeds to process block 213, where the call administrator is informed that the start time for the call has arrived and the conference portion of the call is about to begin. Once this is done, conference call setup process 112 proceeds to process block 214, where a master call start signal is sent simultaneously to every parallel connection process 111, thus causing all conferees to enter the conference portion of the call. Once all connected conferees are placed in conference mode, conference call setup process 112 proceeds to process block 215, where an announcement is delivered simultaneously to all connected conferees that the conference call is now starting and the start time of the conference portion of the call is recorded.

At this point, conference call setup process 112 proceeds to manual input block 216, entering a tight loop comprised of manual input block 216, decision block 217 and decision block 221. In this loop, conference call setup process 112 monitors the conference call conditions to determine when the call has ended (or should end). In manual input block 216, a test is made to determine whether a signal has been received that commands conference call setup process 112 to end this conference call. The results of this test are evaluated in decision block 217, where, if the END CALL signal is received, conference call setup process 112 exits this loop and flows to process block 218, but if the END CALL signal is not received, conference call setup process 112 remains inside this loop, flowing to decision block 220.

Now following the flow of conference call setup process 112, when the results of the test are that the END CALL signal is received, the flow goes to process block 218, where all remaining conference call participants are notified that the conference call is ended. Proceeding on from there, process block 219 is entered, where a master END CALL signal is sent to each active parallel connection process 111, commanding each to disconnect its portion of the conference call. From here, conference call setup process 112 proceeds to process block 221, where the conference call is terminated (ended) and the termination time of the conference call is recorded, whereupon the main loop of conference call setup process 112 proceeds to process termination block 222, where conference call setup process 112 is terminated.

Now, instead, following the flow of conference call setup process 112, starting at decision block 217, when the results of the test are that the END CALL signal is not received, the flow goes to decision block 220, where it is determined whether more than zero conferees are still connected to the conference call. If there is a quantity greater than zero of conferees still connected to the call, then conference call setup process 112 reenters this loop by flowing into manual input block 216. If it is determined, however, in decision block 220 that there are zero conferees still connected to the conference call, then conference call setup process 112 exits this loop, flowing to process block 221, where the call is terminated (ended) and the termination time of the conference call is recorded, whereupon conference call setup process 112 proceeds to process termination block 222, where conference call setup process 112 is terminated.

Initiating a Call to a Conferee

Figure 2A:
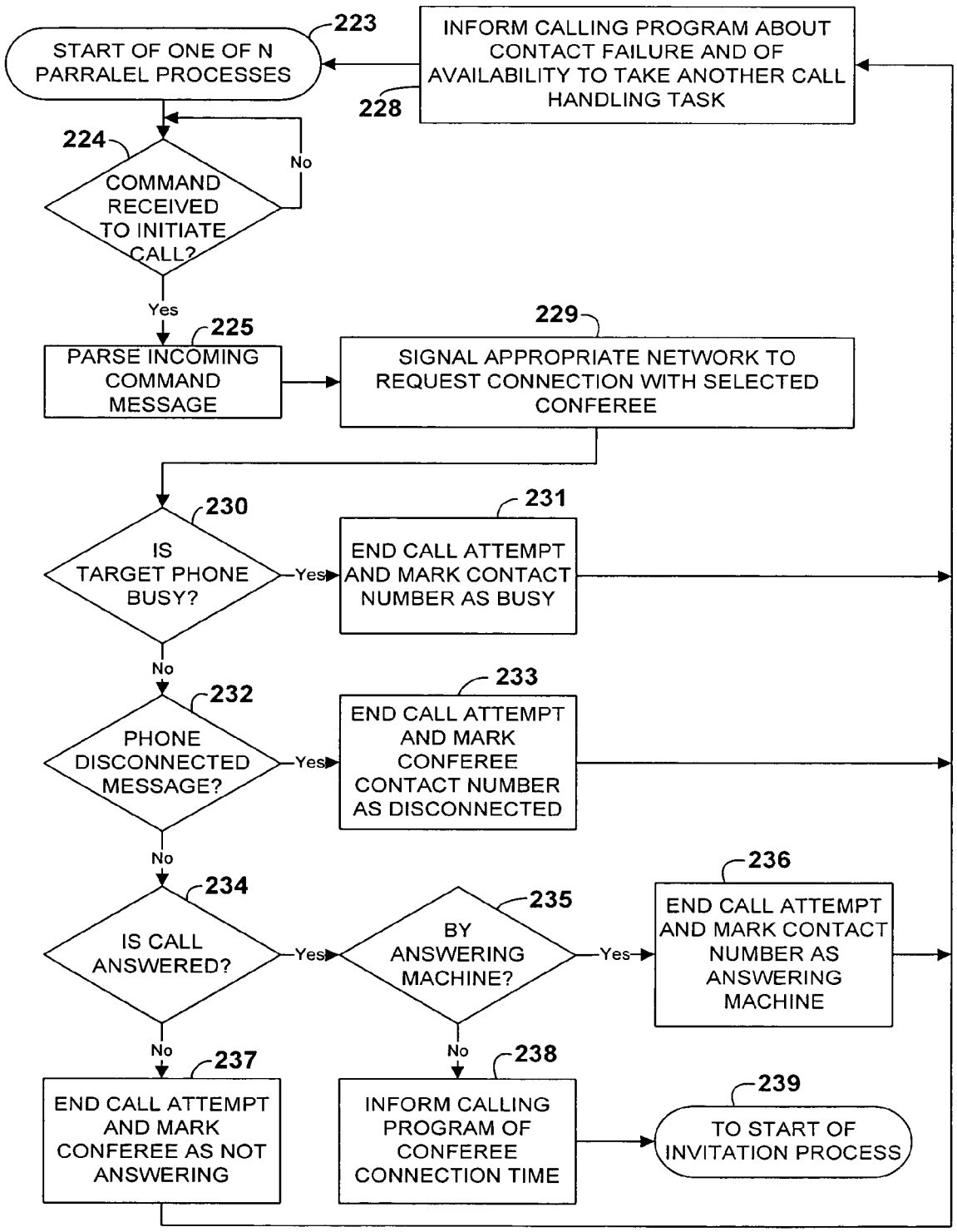
FIG. 2a is a simplified flow chart of one of n parallel conferee connection processes of the conferencing controller server software according to the preferred embodiment of the invention.

Now referring to FIG. 2a of the drawings, it can be seen that, from starting point block 223, one of n identical parallel conferee connection processes 111 proceeds immediately to decision block 224. In decision block 224 it is determined whether a command has been received to initiate a call to a selected conferee from conferee list 113. Note that this instance of parallel conferee connection processes 111 is in communication with conference call setup process 112, from which this command to initiate a call is received.

If in decision block 224 it is determined that the command to initiate a call has not been received, the software re-enters decision block 224 remaining in a very tight loop (effectively continuously monitoring for the receipt of the command).

If the command to initiate a call is received, the software flows from decision block 224 to process block 225 where the received command data is parsed to retrieve the parameters related to the conferee that will be contacted. Refer to Table 1, for a list of parameters that can be stored for each conferee in conferee list 113.

From process block 225 the software proceeds to process block 229. In process block 229, the appropriate network is signaled (PSTN, VoIP, or any other type) to initiate a connection to the selected conferee (using the parameters acquired from conferee list 113) before the software flows to decision block 230.

Now in decision block 230 it is determined whether the target phone is 'busy'. If the target phone is busy, the software proceeds to process block 231 where the call attempt is ended and a statistic for this conferee is recorded that indicates that the conferee's phone was busy during the attempt to contact the conferee. From process block 231, the software flows to process block 228 where the calling program is informed about the contact failure and of the availability of this instance of one of n parallel conferee connection process 111 to accept another call handling task. From process block 228 the software returns to starting point block 223. If in decision block 230 it is determined that the target phone is not busy, the software proceeds to decision block 232.

In decision block 232 it is determined whether a 'phone disconnected' message is received during the attempt to contact the selected conferee. If a 'phone disconnected' message was received, the software proceeds to process block 233 where the call attempt is ended and a statistic for this conferee is recorded that indicates that a 'phone disconnected' message was received during the attempt to contact the conferee. From process block 233, the software flows to process block 228 where the calling program is informed about the contact failure and of the availability of this instance of one of n parallel conferee connection process 111 to accept another call handling task. From process block 228 the software returns to starting point block 223. If in decision block 232 it is determined that a 'phone disconnected' message was not received, the software proceeds to decision block 234.

In decision block 234 it is determined whether the call was answered in response to the attempt to contact the selected conferee. If the call was not answered, the software proceeds to process block 237 where the call attempt is ended and a statistic for this conferee is recorded that indicates the call was not answered. From process block 237, the software flows to process block 228 where the calling program is informed about the contact failure and of the availability of this instance of one of n parallel conferee connection process 111 to accept another call handling task. From process block 228 the software returns to starting point block 223. If in decision block 234 it is determined that the call was answered, the software proceeds to decision block 235.

In decision block 235 it is determined whether the call was answered by an answering machine in response to the attempt to contact the selected conferee. If the call was answered by an answering machine, the software proceeds to process block 236 where the call attempt is ended and a statistic for this conferee is recorded that indicates the call was answered by an answering machine. From process block 236, the software flows to process block 228 where the calling program is informed about the contact failure and of the availability of this instance of one of n parallel conferee connection process 111 to accept another call handling task. From process block 228 the software returns to starting point block 223. If in decision block 235 it is determined that the call was not answered by an answering machine, the software proceeds to process block 238.

If the software enters process block 238, it indicates that a connection has been made and that the call has been answered by a person (not an answering machine). In process block 238 the calling program is informed of the time that the connection was made. From the software flows through connection point 239 and connection point 240 (shown in FIG. 2b), thereby entering the invitation process for this connection.

Invitation Process

Figure 2B:
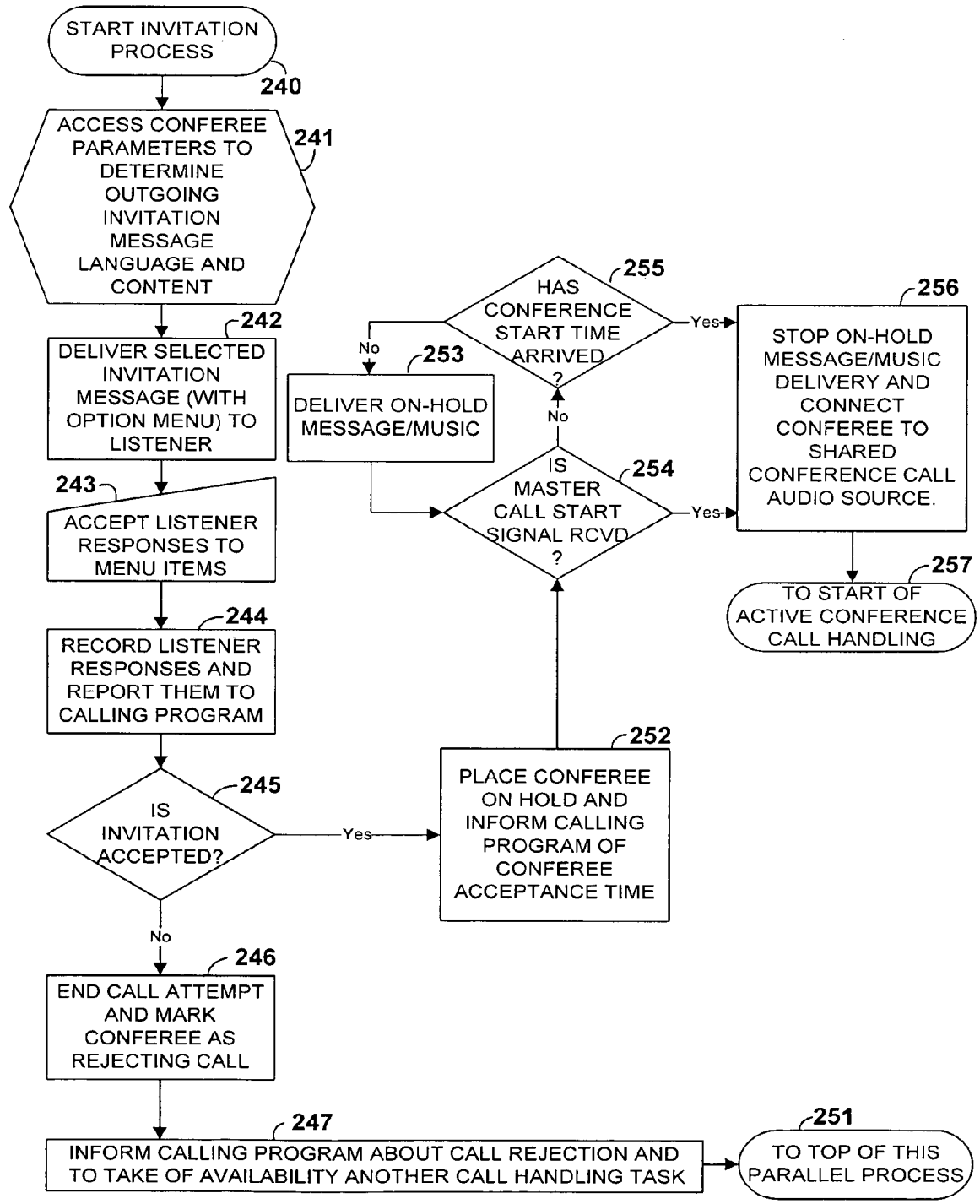
FIG. 2b is a simplified flow chart of the automatic invitation process of the conferencing controller server software according to the preferred embodiment of the invention.

Now referring to FIG. 2b of the drawings, it can be seen that connection point 240 is the starting point for the invitation process used by one of n parallel connection processes 111. From connection point 240 the software flows directly to preparation block 240, where data from conferee list 113 is accessed to determine the language and content of the outgoing message(s) that will be delivered to the selected conferee. Once this is accomplished the software proceeds to process block 242 where the selected spoken invitation is delivered to the listener (including an option menu). At this point the software proceeds to manual input block 243 where listener responses to the delivered menu are accepted.

Once the listener responses have been accepted, the software flows to process block 244, where the accepted responses are recorded and then reported back to the calling program. From process block 244, the software flows to decision block 245 where it is determined whether the invitation to the conference call has been accepted by the listener.

If the listener did not accept the invitation, the software proceeds to process block 246 where the call attempt is ended and a statistic is recorded that indicates that the conferee rejected the invitation to this conference call. From here, the software proceeds to process block 247 where the calling program is informed about the call rejection and of the availability of this instance of parallel connection process 111 to accept assignment to another connection attempt. Following this, the software proceeds through connection point 251 back to the top of the parallel process (connection point 223 shown in FIG. 2a).

If, in decision block 245, it is determined that the listener did accept the invitation, the software proceeds to process block 252 where the conferee is placed on hold and the calling program is informed of the acceptance time for this conferee. At this point the software proceeds to process block 254 where it is determined whether a master call start signal has been received. If a master call start signal has not been received, the software proceeds to decision block 255 where it is determined whether the conference start time has arrived.

If the conference start time has not arrived, the software proceeds to process block 253, where an on-hold message or music is delivered to the conferee until the conference portion of the call begins.

Process block 253, decision block 254 and decision block 255 comprise a tight loop that continues until either a predetermined conference start time arrives or a master 'call start' signal is received. If either of these two conditions is met, the software proceeds to process block 256 where delivery of the on-hold message or music is stopped and the conferee is connected to the shared conference call audio source (thus joining the conference portion of the call).

From here the software proceeds through connection point 257 to connection point 258 (shown in FIG. 2c) where the active conference call handling process begins.

Active Conference Call Handling Process

Figure 2C:
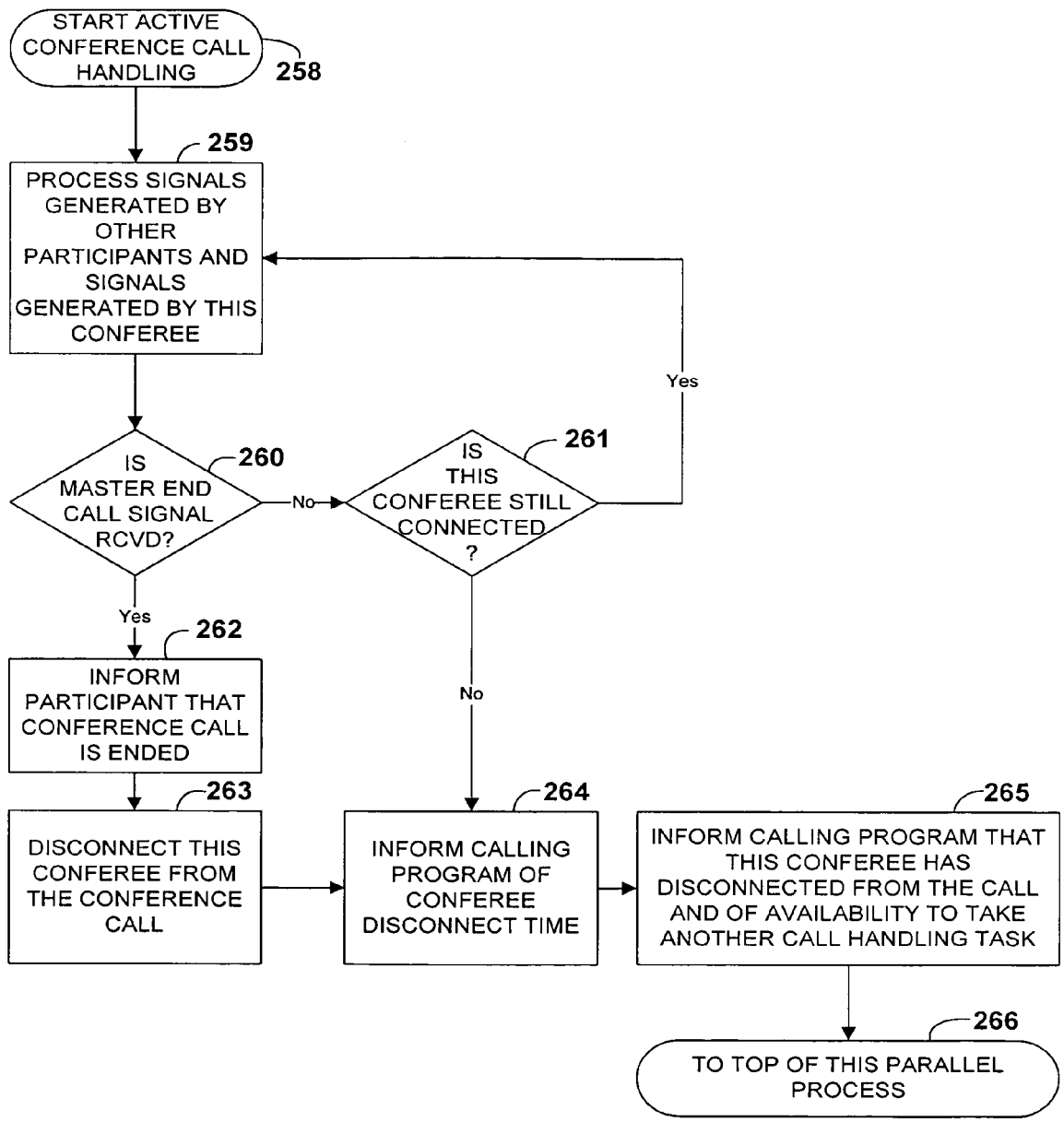
FIG. 2c is a simplified flow chart of the automatic active conference call handling process of the conferencing controller server software according to the preferred embodiment of the invention.

Now referring to FIG. 2c of the drawings, it can be seen that the active conference call handling process starts in connection point 258. From here the software proceeds immediately to process block 259 where the software continuously processes signals generated by other participants and signals generated by this conferee until the conference call is ended or the conferee disconnects from the call.

Process block 259 is part of a tight loop that includes decision block 260 and decision block 261. In this loop, if it is determined in decision block 260 that a master 'end call' signal has been received, the software flows to process block 262 where the conferee is informed that the conference call has ended. Once this has occurred, the software proceeds to process block 263 where this conferee is disconnected from the conference call. After disconnecting the conferee, the software proceeds to process block 264 where the calling program is informed of this conferee's disconnect time. From here, the software proceeds to process block 265 where the calling program is informed that this conferee has disconnected and this instance of parallel connection process 111 is available for accepting assignment of another call handling task.

If, during the processing of the tight loop comprised of process block 259, decision block 260 and decision block 261, it is determined in decision block 261 that the conferee is not still connected (the connection was accidentally lost or the conferee intentionally disconnected), the software proceeds to process block 264 and proceeds as described earlier.

Alternate Interconnection of System Elements

Figure 3:
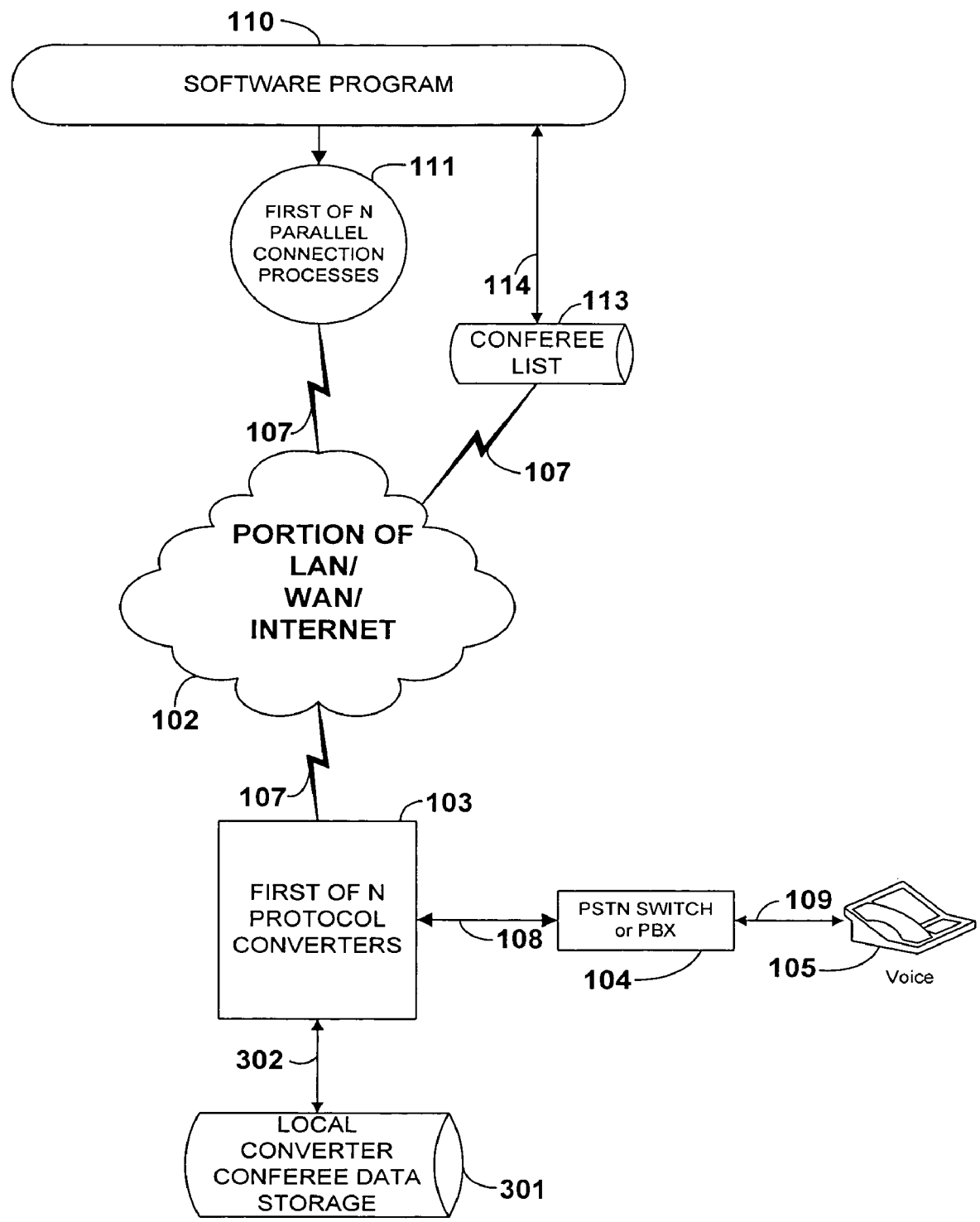
FIG. 3 is a simplified block diagram showing the interconnection of system elements according to an alternate embodiment of the invention.

Now referring to FIG. 3 of the drawings, it can be seen that, in an alternate embodiment of the invention, for any of n protocol converters 103, there are two new elements and one new communications path added to the architecture. These new elements enable protocol converter 103 to locally store (in local converter conferee data storage 301) some or all of the data contained in conferee list 113. Protocol converter 103 accesses data stored in local converter conferee data storage 301 via local storage access path 302.

In this embodiment of the invention conferee list 113 is accessed by protocol converter 103 through a portion of a LAN/WAN/INTERNET 102 network using an appropriate data protocol via instances of data network path 107.

In this arrangement, protocol converter 103 accesses conferee list 113 to acquire the data for one or more listed conferees. This data is stored in local converter conferee data storage 301 for later access. This distribution of data from conferee list 113 allows the parallel nature of the call setup process to become even broader. In this configuration, software program 110 can, through any of n parallel connection processes 111, send a single command to an instance of protocol converter 103, thereby causing that instance of protocol converter 103 to start its own internal process of performing a parallel connection effort to contact those conferees that are locally stored in local converter conferee data storage 301.

Because each instance of protocol converter 103 can have multiple instances of telephony interface path 108, though which communication is established with an instance of PSTN switch or PBX 104, protocol converter 103 can initiate multiple connection attempts in parallel. Thus, protocol converter 103 can convert protocol for multiple conversations occurring through each instance of PSTN switch or PBX 104 as it communicates with each traditional voice telephone 105 through a switch-to-phone interface 109.

Since, in this embodiment of the invention, protocol converter 103 already has a stored version of the information necessary to contact its pre-assigned list of conferees, parallel connection process 111 does not need to resend this information. Instead, a much shorter message is sent that provides a unique conference call identifier, triggering protocol converter 103 to start the internal process of establishing contact with those pre-assigned conferees that are associated with the specified conference call.

Software program 110 determines which instances of protocol converter 103 have a to locally stored copy of data from conferee list 113 by accessing conferee list 113 through communications path 114, and then discovering which conferee records have a non-blank 'Remote cache' field. A non-blank 'Remote cache' field will contain the identity of the remote network resource where information about this conferee is stored (locally cached). In this manner, software program 110 can assemble a list of remote instances of protocol converter 103 that must be contacted and triggered with a short command when initiating a conference call. Of course this does not limit the ability of software program 110 to simultaneously utilize the same instance of protocol converter 103 for initiating individual connection attempts as is done in the preferred embodiment of this invention.

Using Connection Statistics

Figure 4:
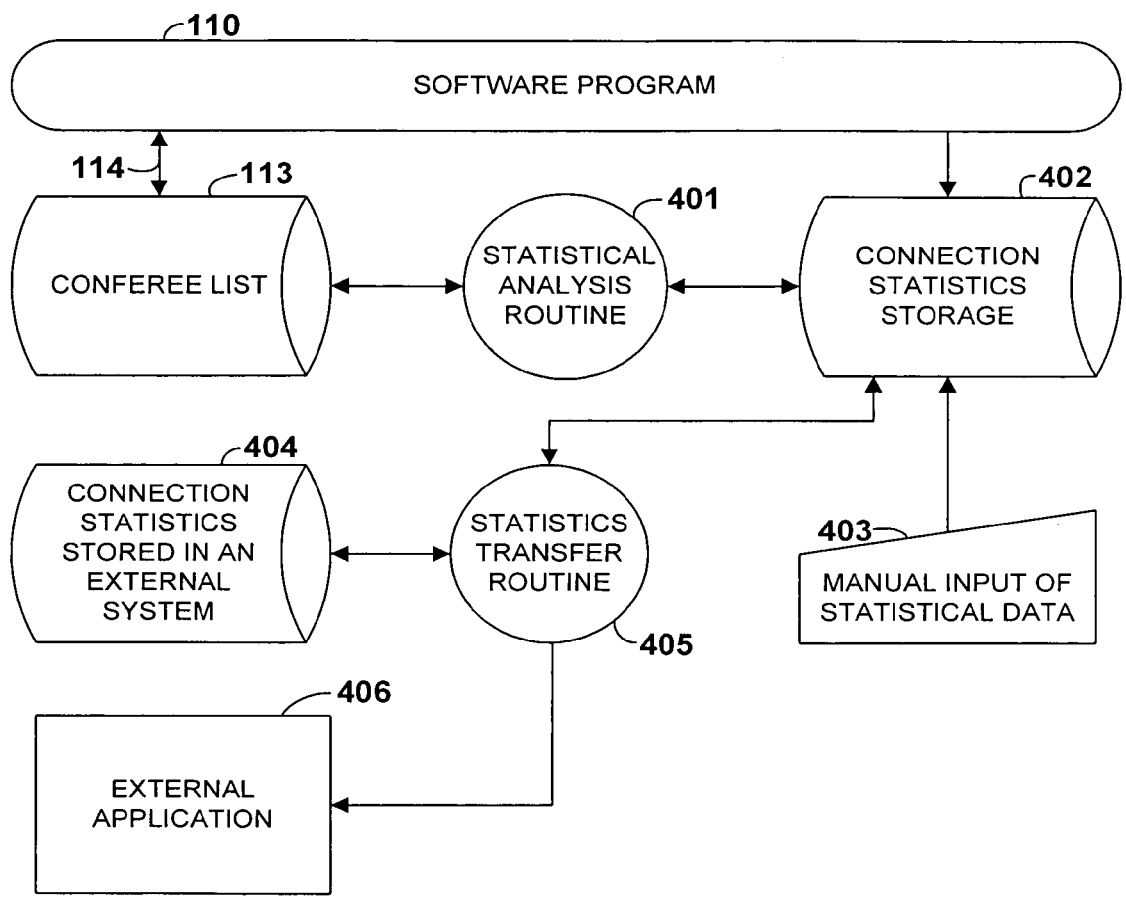
FIG. 4 is a simplified block diagram of the subsystem elements involved with using connection statistics according to the preferred embodiment of the invention.

Now referring to FIG. 4 of the drawings, it can be seen that the subsystem elements involved with using connection statistics are shown along with their interconnection scheme. This subsystem handles the acquisition and management of conference call connection statistics. Additionally, this subsystem contains statistical analysis routine 401, which analyzes the gathered statistics and uses the results of the analysis to modify the contents of conferee list 113. The changes made to conferee list 113 are intended to improve overall connection time coordination (minimizing the time that will elapse between connection of the first conferee to a conference call and the connection of the last conferee to the same call).

While minimizing the total time elapsed to connect all conferees to a call is important (and appropriately addressed by the present invention), it is also very important to insure that the first connectees to the conference call not be required to wait any longer than necessary for the conference portion of the call to start. Surprisingly, this may mean slowing down (increasing) connection times for specific conferees in order to insure that their actual connection time coincides with the connection times of other conferees. For instance, if the statistical information about conferee 'A' indicates that a connection to this conferee takes an average of 12 seconds, and the statistical information about conferee 'B' indicates that a connection to this conferee takes an average of 6 seconds, the connection attempt for conferee 'B' can be delayed by 6 seconds (relative to that of conferee 'A') to cause both conferees to be connected at the same time. As shown in Table 1 (contents of conferee list), a "Start time offset" parameter is included for each conferee. This parameter can be modified as appropriate for each conferee on the list to best coordinate connection times.

Now referring once again to FIG. 4, it can be seen that communications between software program 110 and conferee list 113 occurs through communications path 114. During the conference call setup process, software program 110 accesses conferee list 113 to acquire, for each conferee on the list, the parameters related to making a connection with that conferee. Refer to Table 1 for a list of the preferred conferee parameters. These connection parameters are modified as necessary by the subsystem depicted in FIG. 4, based on the results of analysis of connection statistics gathered previously during the process of setting up conference calls involving conferees contained in conferee list 113.

Referring now to Table 2, a list of possible elements of statistical data that can be used by statistical analysis routine 401. These data, as well as others, can be used by the invention when analyzing the results of previous connection attempts to conferees.

TABLE 2

Connection Statistics

| STATISTICS ELEMENT | DESCRIPTION |
| --- | --- |
| Conferee ID | Links these statistics to a specific conferee. |
| Network used | The network that was used when contacting this conferee. |
| Protocol used | The protocol that was used when contacting this conferee. |
| Switch/PBX used | The switch or PBX that was used when contacting this conferee. |
| Phone number/ Network address | The telephone number or network address (for VoIP or similar connection) that was used when contacting this conferee. |
| Connection status | The status of the telecommunications connection attempt (did the selected network successfully connect to the target conferee's phone, or was a busy or other non-connect signal encountered?). |
| Connection time | The time that elapsed between the time that the selected network was sent the appropriate signals/data to initiate the connection and the time that the selected network signaled that a connection was established (phone is now ringing). |
| Ring time | The amount of time that the conferee's phone rang before being answered. |
| Call accepted? | Did the conferee accept the invitation to the conference call? |
| Conferee interaction time | The amount of time that elapsed while the conferee was responding to the automated invitation process. |

Now referring once again to FIG. 4, it can be seen that software program 110 sends statistical data related to each conference call to connection statistics storage 402. Statistical analysis routine 401 accesses connection statistics storage 402 to acquire historic statistical data for analysis.

Statistics storage 402 stores the statistical data in a format that is understood by software program 110. The statistical data stored in statistics storage 402 can come from sources other than software program 110. This subsystem accommodates the manual input of data 403, as well as automated importation of connection statistics stored in an external system 404. Through the use of statistics transfer routine 405 an automated process of converting externally sourced statistics into a format understandable by software program 110 is implemented. Statistics transfer routine 405 also stores the converted data in statistics storage 402. In this way, the advantages of the statistical analysis are expanded by allowing inclusion of statistical data from other sources.

Similarly, statistical data stored in statistics storage 402 can be exported to external system 404 through the use of statistics transfer routine 405.

As an additional benefit, the statistical data stored in statistics storage 402 can be converted to an appropriate format and exported to external applications 406 via statistics transfer routine 405. In this way, external systems can utilize the data for their own purposes.

Once a statistical analysis has been performed, and the entries in conferee list 113 have been modified, software program 110 will use the newer parameters contained in conferee list 113 when attempting to connect to any of the listed conferees.

Non-Hosting Conference Controller Arrangement

Figure 5:
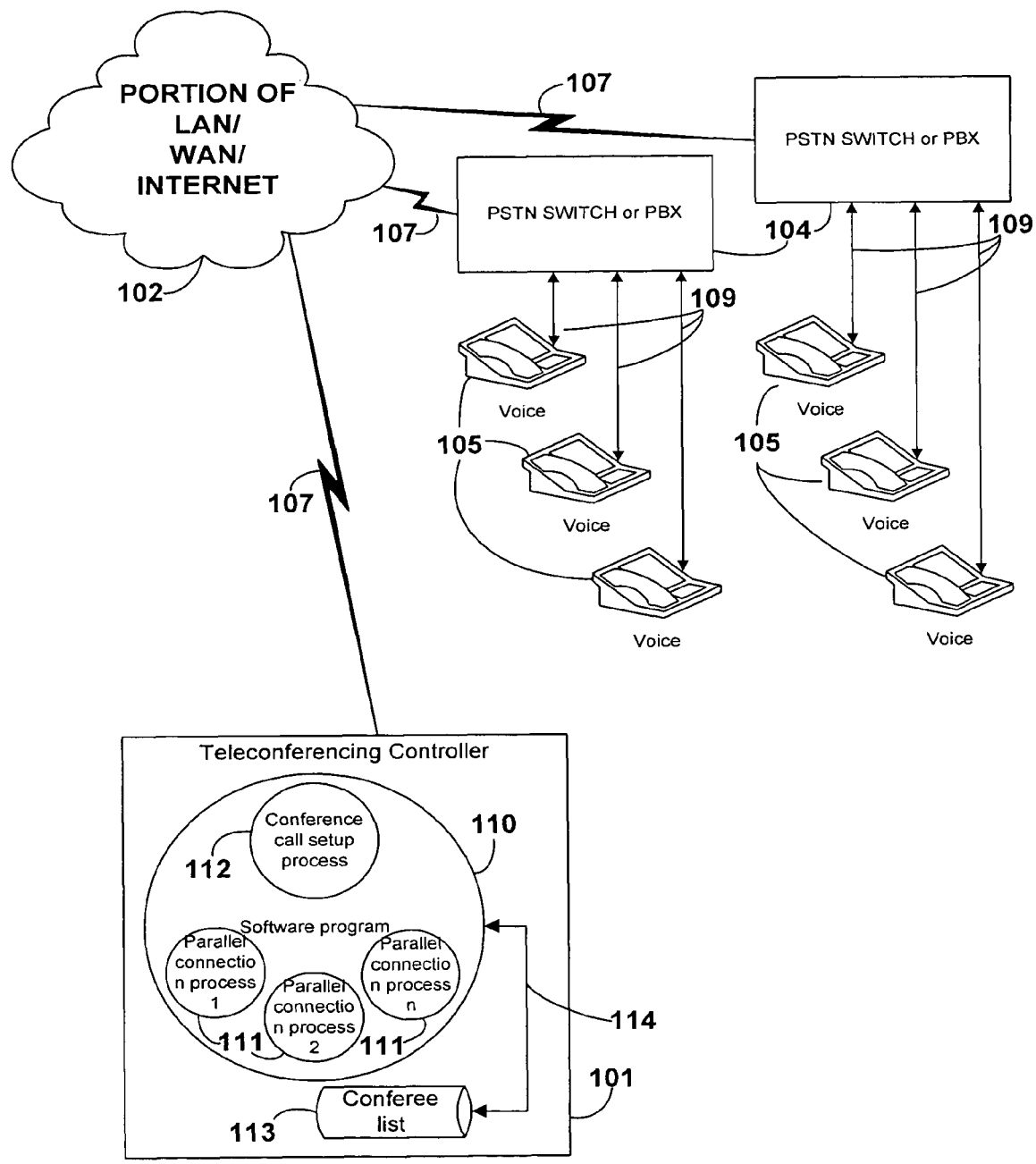
FIG. 5 is a simplified block diagram of an alternative arrangement of the invention's hardware architecture, where the conferencing controller does not host the conference call, and data connections to telephony switches are made directly, without involving VoIP gateways or protocol conversion of voice between VoIP and traditional telephony protocols.

Now referring to FIG. 5 of the drawings, it can be seen that, in an alternate embodiment of the invention, the requirement is eliminated for including a protocol converter 103 and telephony interface path 108 (both seen in FIG. 1 as elements of the hardware architecture of the preferred embodiment of the invention). Additionally, in this embodiment of the invention, teleconferencing controller 101 does not host the conference call. Instead, teleconferencing controller 101 simply sets up the call that will be hosted on another device (such as an instance of PSTN switch or PBX 104).

In the alternate embodiment of the invention depicted in FIG. 5, it can be seen that there is a software program 110 operating to control teleconferencing controller 101. Software program 110 contains conference call setup process 112, which is triggered when software program 110 detects a condition indicating that a conference call should be started. Additionally, software program 110 controls the existence and operation of all of n instances of parallel connection process 111. Available for access by software program 110 operating (and preferably residing within teleconferencing controller 101) is conferee list 113. Communications between software program 110 and conferee list 113 occurs through communications path 114.

Teleconferencing controller 101 is connected to, and communicates with, a portion of a LAN/WAN/INTERNET 102 network through a data network using an appropriate switch communications protocol via data network path 107. A plurality of PSTN switches or PBXs 104 is also connected to a portion of LAN/WAN/INTERNET 102, each through a data network path 107. Each PSTN switch or PBX 104 communicates with each of a plurality of traditional voice telephones 105 through a switch-to-phone interface 109. This link represents any of the available well known standard telephony interfaces between switching systems and telephones as well as any privately held proprietary interface between a telephony switch and its associated telephone base.

In the alternate embodiment of the invention depicted in FIG. 5, the communications protocol used between teleconferencing controller 101 and PSTN switch or PBX 104 accommodates teleconferencing controller 101 instructing PSTN switch or PBX 104 to initiate calls to specified PSTN telephones. Conferee list 113 is used by software program 110 to ermine which PSTN switch or PBX 104 is used to contact each listed conferee. In this embodiment of the invention, instead of only providing PSTN switch or PBX 104 with the connection information related to the target conferee, software program 110 also provides information that identifies where the conference call is being hosted, so PSTN switch or PBX 104 can establish a connection between the target conferee and the resource that is hosting the conference call.

It can therefore be seen that software program 110 controls the methods that the apparatus of this invention use to provide the functions, features, and advantages claimed herein.

What is claimed is:

1. A teleconferencing control system that simultaneously out dials to multiple selected conferees through a plurality of parallel telecommunications resources, comprising:
    a teleconferencing controller in communication with a plurality of available parallel telephony communications connection resources;
    wherein upon receiving a predetermined trigger to initiate said conference call between said multiple selected conferees, or upon being triggered by a predefined set of conditions, said teleconferencing control system initiates said conference call, wherein said teleconferencing controller establishes a telecommunications connection simultaneously, between as many of said multiple selected conferees as can be contacted, said teleconferencing controller including:
    means for accessing a list of said multiple selected conferees, said list at a minimum including an entry for each one of said multiple selected conferees, each said entry containing at least sufficient information to enable said teleconferencing control system to attempt a simultaneous telecommunications connection with the associated one of said multiple selected conferees to deliver an invitation to said conference call and each said entry being updated according to the statistics data;
    means for simultaneously initiating connection attempts to a plurality of said multiple selected conferees, wherein at least two of said connection attempts are routed through separate parallel connection resources of said plurality of available parallel telephony communications connection resources; and
    means for minimizing a total time elapsed to connect each of said multiple selected conferees to said conference call by using said updated entry;
    wherein upon connection to each one of said multiple selected conferees, said teleconferencing controller enables said one of said multiple selected conferees to participate in said conference call based upon an acceptance of said invitation to said conference call.

2. The system of claim 1, wherein each said entry in said list of said multiple selected conferees comprises information sufficient for enabling said teleconferencing control system to select between a plurality of alternate connection paths, each with an associated different communications protocol, when determining an attempt to connect to said one of said multiple selected conferees.

3. The system of claim 2, wherein said teleconferencing control system applies automatic detection of any connection attempt failure that is due to a busy signal, non-connect recording, or any detectable non-connect condition, recording details of said connection attempt failure along with an identifier that indicates which said one of said multiple selected conferees is associated with said connection attempt failure; and
    wherein upon detection of said connection attempt failure, said teleconferencing control system makes at least one subsequent connection attempt to said one of said multiple selected conferees via at least one of said plurality of alternate connection paths using said associated different communications protocol.

4. The system of claim 1, wherein said teleconferencing control system applies automatic detection of any connection attempt failure that is due to a busy signal, non-connect recording, or any detectable non-connect condition, thereby recording details of said connection attempt failure along with an identifier that indicates which said one of said multiple selected conferees is associated with said connection attempt failure.

5. The system of claim 4, wherein said teleconferencing control system prevents further attempts to connect to said one of said multiple selected conferees associated with said connection attempt failure, notifying users of said teleconferencing control system that contact information of said one of said multiple selected conferees should be updated.

6. The system of claim 1, wherein said teleconferencing control system enables each of said multiple selected conferees to inform said teleconferencing control system that said teleconferencing control system has reached an appropriate party.

7. The system of claim 6, wherein when said teleconferencing control system is informed that a wrong party has been reached, said system prevents said wrong party from joining said conference call.

8. The system of claim 1, wherein said teleconferencing control system enables each of said multiple selected conferees to accept or reject said invitation to said conference call.

9. The system of claim 1, wherein said teleconferencing control system, upon connection to each one of said multiple selected conferees and detection of the presence of one of a call answering automation system, prevents said call answering automation system from connecting to said conference call.

10. The system of claim 1, wherein said teleconferencing control system stores conference call activity statistics for each said conference call, including call initiation start time, operational conference call start and end times, individual conferee connection and disconnect times, which of said plurality of available parallel telephony communications connection resources were associated with each said connection, and any failures associated with attempting to contact any one of said multiple selected conferees.

11. The system of claim 10, wherein said teleconferencing control system makes said conference call activity statistics available to external processes for analysis and billing purposes.

12. The system of claim 10, wherein said teleconferencing control system utilizes said conference call activity statistics gathered during each said conference call to achieve improved connection time synchronization in a subsequent conference call involving any of said multiple selected conferees.

13. The system of claim 12, wherein said improved connection time synchronization being achieved for said subsequent conference call involves any of said multiple selected conferees by determining a connection offset time value for each said one of said multiple selected conferees that is targeted for participation in said subsequent conference call by calculating a statistical average of recorded connection times that have been recorded for said one of said multiple selected conferees.

14. The system of claim 13, wherein for each of said multiple selected conferees that is targeted for participation in said subsequent conference call, a connection start time is determined by subtracting said connection offset time value from a target start time for said subsequent conference call.

15. The system of claim 14, wherein for each of said multiple selected conferees that is targeted for participation in said subsequent conference call, a connection process is begun to said one of multiple selected conferees at said connection start time associated with one of said multiple selected conferees.

16. A method for teleconferencing that simultaneously out dials to multiple selected conferees through a plurality of parallel telecommunications resources, comprising:
automatically accessing a list of the multiple selected conferees from a database, using a teleconferencing controller, the list including an entry for each of the multiple selected conferees, each entry having sufficient information to attempt a simultaneous telecommunications connection with the associated conferee to deliver an invitation to a conference call and each said entry being updated according to the statistics data;
simultaneously initiating connection attempts to a plurality of the multiple selected conferees using said teleconferencing controller, wherein at least two of the connection attempts are routed through separate available parallel telephony communications connection resources to deliver said invitation to said conference call; and
minimizing a total time elapsed to connect said multiple selected conferees to said conference call by using said updated entry.

17. The method of claim 16, wherein the method is at least partially implemented with a teleconferencing controller.

18. The method of claim 16, further comprising acquiring conference call activity statistics from at least one conferee call.

19. The method of claim 18, wherein the conference call activity statistics include one or more conference call activity statistics from the set including a minimum call initiation start time, operational conference call start and end times, individual conferee connection and disconnect times, which of the available parallel telephony communications connection resources were associated with each telecommunications connection, and any failures associated with attempting to contact any one of the multiple selected conferees.

20. The method of claim 18, further comprising using the conference call activity statistics to improve connection time synchronization.

* * * * *

UNITED STATES PATENT AND TRADEMARK OFFICE
CERTIFICATE OF CORRECTION

| | | |
|---|---|---|
| PATENT NO. | : 7,852,998 B1 | Page 1 of 1 |
| APPLICATION NO. | : 10/954837 | |
| DATED | : December 14, 2010 | |
| INVENTOR(S) | : Rodney A. Smith et al. | |

It is certified that error appears in the above-identified patent and that said Letters Patent is hereby corrected as shown below:

On the Title Page, Item (75)
- The third inventor's name is currently omitted on the patent. Please correct the list of inventors to be listed as --Rodney A. Smith, Washington, DC (US); Vladimir Smelyansky, Glenview, IL (US); Roman Marchevsky, Libertyville, IL (US)--.

Signed and Sealed this
First Day of May, 2012

David J. Kappos
*Director of the United States Patent and Trademark Office*